UNITED STATES PATENT OFFICE.

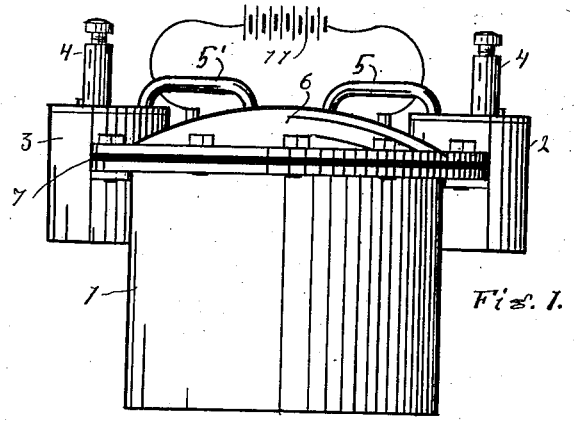
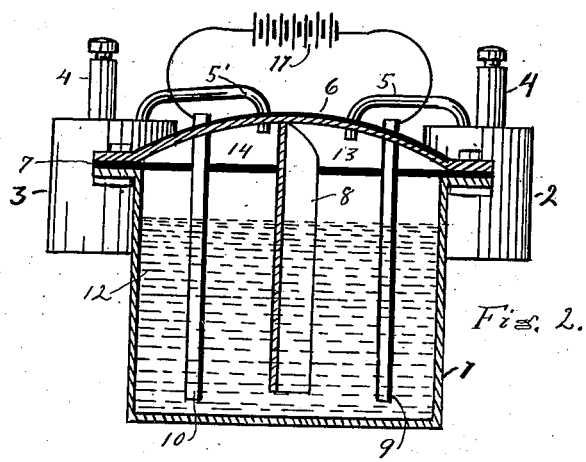
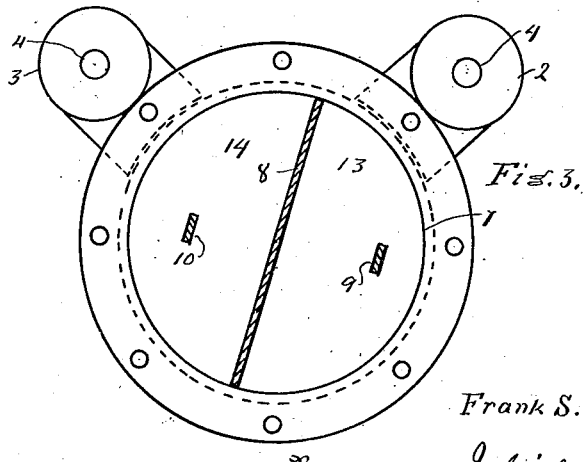

FRANK S. VINCENT, OF GRAND RAPIDS, MICHIGAN.

PROCESS FOR EXTRACTING GASES FROM LIQUIDS.

1,398,658.

Specification of Letters Patent.  Patented Nov. 29, 1921.

Application filed January 13, 1919. Serial No. 270,967.

*To all whom it may concern:*

Be it known that I, FRANK S. VINCENT, a citizen of the United States, residing at Grand Rapids, in the county of Kent and State of Michigan, have invented certain new and useful Improvements in Processes for Extracting Gases from Liquids, of which the following is a specification.

This invention relates to the process of extracting oxygen gas and hydrogen gas from water by the use of electricity, and its objects are: first, to increase, as much as possible, the efficiency of the electric current in extracting the gases; second, to provide a means whereby the gases may be drawn off into separate receptacles without danger of mixing together, and, third, to provide a means whereby the gases may be produced and drawn off more readily and rapidly than is possible under present conditions.

I attain these objects by the use of the implement illustrated in the accompanying drawing, in which Figure 1 is an elevation, Fig. 2 is a sectional elevation, and Fig. 3 is a plan of the implement, the cover being removed in Fig. 3 and the partition and electrodes being shown in section. In the process as at present practised the water 12 is placed into a receptacle, open or closed, as may be, under atmospheric pressure, and the receptacle so constructed that the two gases will intermingle in the air space above the water. By this process the resistance is so slight that the gases are extracted very slowly, passing from the surfaces of the electrodes in very small, infrequent bubbles, which is overcome in my process as follows:

In my process I make use of any available form of receptacle or tank, as 1, which is provided with a cover 6, so constructed that with the use of proper packing substance, as 7, the tank may be rendered air tight. The cover 6 has a partition 8 formed therein and depending downwardly from the lower surface of the cover to within a short distance of the bottom of the tank, and of a width to fill the diameter of the tank sufficiently to avert the danger of the gases leaking between the edges of the partition and the walls of the tank. I then place an electrode 9 in one cell of the tank forming the anode plate in an electrolytic process, and an electrode 10 in the other cell of the tank forming the cathode plate in said process arranged to complete an electric circuit from any available source of supply, as the battery indicated at 11, through the water in the tank, from one electrode to the other, either under, or through the partition 8.

To complete an available mechanical producer I place two storage receptacles or tanks, 2 and 3, in positions near the water tank so that pipes 5 may be placed to convey the gases from the respective chambers of the water tank, to the gas receptacles, as follows: Oxygen gas, extracted in the chamber 13 of the tank 1 is carried into the tank 2 through the right hand pipe 5, and hydrogen gas, extracted in the chamber 14 is carried into the tank 3 through the left hand pipe 5'. Thus far the process is not materially different from the processes in common use; but to bring about the full benefits of my invention, in fact the essential features of my invention, I make provisions, as with air pumps 4 upon the tanks 2 and 3, whereby I can remove practically all of the air from both of the chambers 13 and 14, and from both the tanks 2 and 3, thus greatly rarefying the air in the tanks, and removing, as far as possible, the atmospheric pressure from the surface of the water and lessening the density of the water, thus as the rarefication of the air in the tank greatly increases the resistance to the passage of electricity and, in like ratio increases the production of gas from a given body of water with a given current of electricity.

The practical utility of this process is amply verified by the fact that in my experiments I have found that when extracting the gases under ordinary atmospheric conditions the passage of the gases is in very small, and very sparsely distributed bubbles from both electrodes, while the moment the air is removed from the tank the number and size of the bubbles are greatly increased and the amount and quality of gas produced are greatly enhanced.

What I claim as new in the art, is:

1. In the process of extracting gases from liquids by electrolysis, the use of an air tight tank divided into two chambers, said chambers electrically connected and partly filled with an electrolyte and arranged to form a vacant space in each chamber above the electrolyte, an air tight receiving chamber connected with each vacant space above the electrolyte, the electrolyte chambers and the receiving chambers relieved of all air possible, an anode plate partly immersed in the electrolyte in one chamber, a cathode plate partly immersed in the electrolyte in the other chamber, and proper electrical connections with said anode plate and cathode plate for separating the gases from the electrolyte and storing them in their respective receiving chambers.

2. The process of extracting gases from liquids by electrolysis, consisting, first, of placing the liquid in a tank and a receiving chamber connected with each chamber, and two separate chambers having facilities for passing electricity from one chamber into the other chamber, and partly filling said chambers with the liquid to be used; second, extracting all the air possible from the chambers above the liquid and from the receiving chambers; third, passing an electric current into one chamber, through the liquid and out of the other chamber, and, fourth, drawing off the gases and storing them in separate chambers.

3. The process of extracting gases from liquids by electrolysis, consisting of placing the liquid into a properly prepared tank and having the air extracted from the tank before and during electrolyzation, and at the same time removing the gases into air tight receptacles from which the air has first been exhausted.

Signed at Grand Rapids, Michigan, January 11, 1919.

FRANK S. VINCENT.